United States Patent
Rentsch et al.

(10) Patent No.: US 10,059,846 B2
(45) Date of Patent: Aug. 28, 2018

(54) PROCESS FOR PRODUCING A HIGH SOLIDS PIGMENT SUSPENSION COMPRISING CARBOXYMETHYLCELLULOSE-BASED DISPERSANT

(71) Applicant: Omya International AG, Oftringen (CH)

(72) Inventors: Samuel Rentsch, Aarburg (CH); Matthias Buri, Rothrist (CH); Fabio Ippolito, Oftringen (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 118 days.

(21) Appl. No.: 15/026,298

(22) PCT Filed: Oct. 24, 2014

(86) PCT No.: PCT/EP2014/072808
§ 371 (c)(1),
(2) Date: Mar. 31, 2016

(87) PCT Pub. No.: WO2015/062978
PCT Pub. Date: May 7, 2015

(65) Prior Publication Data
US 2016/0237280 A1 Aug. 18, 2016

Related U.S. Application Data

(60) Provisional application No. 61/901,485, filed on Nov. 8, 2013.

(30) Foreign Application Priority Data

Nov. 4, 2013 (EP) ..................... 13191479

(51) Int. Cl.
| | | |
|---|---|---|
| C09C 1/02 | (2006.01) | |
| C09C 3/04 | (2006.01) | |
| D21H 17/67 | (2006.01) | |
| D21H 17/69 | (2006.01) | |

(52) U.S. Cl.
CPC .............. C09C 1/021 (2013.01); C09C 3/041 (2013.01); D21H 17/67 (2013.01); D21H 17/69 (2013.01); C01P 2004/51 (2013.01); C01P 2004/61 (2013.01); C01P 2004/62 (2013.01); C01P 2006/22 (2013.01)

(58) Field of Classification Search
None
See application file for complete search history.

(56) References Cited

U.S. PATENT DOCUMENTS

| | | | | |
|---|---|---|---|---|
| 4,250,305 A | * | 2/1981 | Saito | ....................... C08B 11/20 536/101 |
| 2004/0180993 A1 | | 9/2004 | Shelton et al. | |
| 2010/0330376 A1 | * | 12/2010 | Trksak | .................... C08B 11/08 428/426 |

FOREIGN PATENT DOCUMENTS

| | | |
|---|---|---|
| EP | 0676415 A2 | 4/1995 |
| EP | 2505614 A1 | 10/2012 |
| EP | 2505615 A1 | 10/2012 |
| EP | 2565236 A1 | 3/2013 |
| FR | 2932804 A1 | 6/2008 |
| FR | 2939055 A1 | 12/2008 |
| GB | 1139637 | 1/1969 |
| JP | H0848701 A * | 8/1994 .......... C08B 11/155 |
| JP | H0848701 A | 2/1996 |
| WO | 2005078027 A1 | 8/2005 |

OTHER PUBLICATIONS

International Search Report dated Dec. 17, 2014 for PCT Application No. PCT/EP2014/072808.
Written Opinion of International Searching Authority dated Dec. 17, 2014 for PCT Application No. PCT/EP2014/072808.

* cited by examiner

*Primary Examiner* — Jennifer A Smith
*Assistant Examiner* — Ross J. Christie
(74) *Attorney, Agent, or Firm* — Amster, Rothstein & Ebenstein LLP

(57) ABSTRACT

The present invention relates to a process for preparing an aqueous suspension comprising a mineral pigment material and a depolymerized carboxymethylcellulose having a degree of carboxylation in the range from 0.2 to 2.2, a molecular weight in the range from 5000 to 40000 g/mol, and a polydispersity index in the range from 2 to 10.

29 Claims, No Drawings

PROCESS FOR PRODUCING A HIGH SOLIDS PIGMENT SUSPENSION COMPRISING CARBOXYMETHYLCELLULOSE-BASED DISPERSANT

CROSS-REFERENCE TO RELATED APPLICATIONS

This is a U.S. national phase of PCT Application No. PCT/EP2014/072808, filed Oct. 24, 2014, which claims priority to European Application No. 13191479.8, filed Nov. 4, 2013 and U.S. Provisional Application No. 61/901,485, filed Nov. 8, 2013.

The present invention relates to aqueous suspensions of mineral pigment materials. In particular, the present invention relates to mineral pigment suspensions, which contain additives based on renewable sources, and methods for preparing such suspensions. The present invention also relates to high solids mineral pigment suspensions, which contain additives based on renewable sources, and methods for preparing such suspensions.

Mineral materials are among the main constituents in paints, plastic, cosmetics, paper or paper coating colours. Mineral materials such as calcium carbonate, may provide improvements, for example, in paper and painting quality and agriculture properties, or tooth paste, notably relative to their physical properties such as optical and/or abrasives properties.

For reasons of applicability, pumping, transport, storage and drying costs, it is especially useful to produce mineral materials in form of high solids suspensions, i.e. suspensions where the minority in respect to total weight of the suspension is water. Such high solid suspensions require usually the addition of a dispersing agent or grinding aid in order to maintain the suspension stable, easy to pump and to allow dividing of mineral particles by grinding of such suspensions.

The commonly used dispersing agents or grinding aids, which are efficient for the production and stabilisation of such high solids mineral pigments material suspensions are mainly petro-chemistry based polymers such as salts of polycarboxylates, for example, sodium polyacrylate. However, the use of such petroleum derived products is not desirable from an environmental point view. In particular, to follow the Kyoto protocol and to reduce fossil $CO_2$ pollution of the atmosphere during combustion of the final goods, it is aimed at switching from petro-chemistry based polymers to polymers having a lower carbon dioxide footprint, for example, to polymers which are derived from natural or renewable resources. FR 2 939 055 describes dispersing agents and/or grinding aids based on homopolymers or copolymers of acrylic acid, where the acrylic acid is obtained from glycerol. FR 2 932 804 describes polymers based acrolein and copolymers acrolein/acrylic acid, where the acrolein is obtained from glycerol. However, the process of producing acrolein and acrylic acid from glycerol is very complicated and expensive. Furthermore, harmful intermediate and by-products can be created during the preparation of such bio-based unsaturated monomers. It is also well known that the storage of monomers such as acrylic unsaturated monomers, especially acrolein storage and the polymerization processes need important safety precautions because the monomers are highly reactive, and an uncontrolled polymerization reaction can lead to major incidents for humans and installations.

For completeness, the Applicant would like to mention the unpublished European patent application with filing number 12 167 664.7, which is related to an aqueous suspension comprising a modified polysaccharide.

Therefore, there is a need for dispersing agents and grinding aids, which can be derived from renewable, low toxic resources, and the starting material and the production process of which are less of a security issue.

Accordingly, it is an object of the present invention to provide dispersing agents and grinding aids, which are at least partly derived from renewable natural polymer resources. Furthermore, it would be desirable to provide educts and final polymeric dispersing agents and grinding aids which can be stored without any safety precautions and do not require a complicated preparation process. It would also be desirable to provide dispersing agents and grinding aids, which can be produced without generating harmful by-products or intermediate products. It would also be desirable to provide dispersing agents and grinding aids, which can be produced in high solid concentrations in order to avoid energy intensive concentration steps such as thermal concentration.

It is also an object of the present invention to provide high solids aqueous suspensions of mineral pigment material, which are fluid but contain only low amounts of petro-chemistry based dispersing agents or grinding agents or do not contain petro-chemistry based dispersing agents or grinding agents at all.

It is also an object of the present invention to provide a process for preparing an aqueous suspension, wherein the dispersing agent or grinding aid is directly produced in form of highly concentrated solution in order to avoid energy consuming concentration steps such as thermal concentration.

A further object of the present invention is to reduce or eliminate fossil based dispersants or grinding agents to follow at most the Kyoto protocol, which aims at the reduction of fossil $CO_2$ pollution of the atmosphere during combustion of the final goods. The Kyoto Protocol is an international agreement linked to the United Nations Framework Convention on Climate Change. The major feature of the Kyoto Protocol is that it sets binding targets for 37 industrialized countries and the European community for reducing greenhouse gas (GHG) emissions. This amounts to an average of five percent against 1990 levels over the five-year period 2008 to 2012. The Kyoto Protocol was adopted in Kyoto, Japan, on 11 Dec. 1997 and entered into force on 16 Feb. 2005.

The foregoing and other objects are solved by the subject-matter as defined herein in the independent claims.

According to one aspect of the present invention, a process for preparing an aqueous suspension is provided, comprising the steps of a) providing a mineral pigment material, b) providing a depolymerized carboxymethylcellulose having a degree of carboxylation in the range from 0.2 to 2.2, a molecular weight in the range from 5000 to 40000 g/mol, and a polydispersity index in the range from 2 to 10, wherein the depolymerized carboxymethylcellulose is prepared by depolymerizing a high molecular weight carboxymethylcellulose in a process comprising the following steps:

i) providing a high molecular weight carboxymethylcellulose having a molecular weight of more than 40000 g/mol and a degree of carboxylation in the range from 0.2 to 2.0, ii) providing a peroxide selected from hydrogen peroxide and/or an alkali metal salt thereof,
iii) providing a catalyst,
iv) mixing at least one part of the high molecular weight carboxymethylcellulose of step i) and/or at least one part of the peroxide of step ii) and/or at least one part of the catalyst of step iii) and water in any order at a reaction temperature from 50 to 85° C., and
v) adding the remaining part of the high molecular weight carboxymethyl cellulose and/or the remaining part of the peroxide and/or the remaining part of the catalyst in one or more steps to the mixture obtained in step iv) until the mixture of step v) contains from 10 to 60 wt.-% depolymerized carboxymethylcellulose, based on the total weight of the mixture of step v), and until the mixture of step v) at the same time has a Brookfield viscosity between 30 and 10000 mPa·s at 20° C., wherein during step v) the Brookfield viscosity of the mixture is maintained between 200 and 1500 mPa·s, measured at the reaction temperature, and
c) mixing the depolymerized carboxymethylcellulose of step b), the mineral pigment material of step a) and water to form an aqueous suspension,
wherein the mineral pigment material is added in an amount from 10 to 80 wt.-%, based on the total weight of the suspension, and
wherein the depolymerized carboxymethylcellulose is added in an amount from 0.05 to 5.0 wt.-%, based on the total weight of the mineral pigment material in the suspension, and such that the Brookfield viscosity of the aqueous suspension is between 40 and 2000 mPa·s at 20° C.

According to another aspect of the present invention, an aqueous pigment particle suspension obtainable by the process according to the present invention is provided.

According to still another aspect of the present invention, the use of the aqueous suspension according to the present invention in paper, plastics, paint, food, feed, pharmaceuticals, drinking water and/or agriculture applications is provided.

According to still another aspect of the present invention, pigment particles obtainable by drying the aqueous suspension according to the present invention, and optionally surface treating the dried particles, are provided.

According to still another aspect of the present invention, the use of the pigment particles according to the present invention in plastics, paint and/or sealant applications is provided.

Advantageous embodiments of the inventive method are defined in the corresponding sub-claims.

According to one embodiment, the mineral pigment material is a calcium carbonate containing material, preferably selected from calcium carbonate, calcium carbonate containing minerals, mixed carbonate based fillers, or mixtures thereof. According to another embodiment, the mineral pigment material is kaolin, talc, gypsum, lime, magnesia, titanium dioxide, satin white, aluminium trioxide, aluminium trihydroxide, silica, mica, or mixtures thereof. According to still another embodiment, the mineral pigment material is in form of particles having a weight median particle size $d_{50}$ from 0.1 to 100 µm, from 0.25 to 50 µm, or from 0.3 to 5 µm, preferably from 0.4 to 3.0 µm.

According to one embodiment, the degree of carboxylation of the depolymerized carboxymethylcellulose is in the range from 0.5 to 1.8, and preferably from 0.6 to 1.4.

According to another embodiment, the depolymerized carboxymethylcellulose is added in an amount from 0.05 to 3.0 wt.-%, preferably from 0.1 to 2.0 wt.-%, and more preferably from 0.2 to 1.0 wt.-%, based on the total weight of the mineral pigment material of the suspension. According to still another embodiment, the depolymerized carboxymethyl cellulose has a polydispersity index from 2 to 5, preferably from 2.5 to 4.5, and more preferably from 3 to 4. According to still another embodiment, the depolymerized carboxymethyl cellulose has a molecular weight in the range from 8000 to 35000 g/mol, and most preferably from 10000 to 20000 g/mol.

According to one embodiment, the solids content of the suspension obtained in step c) is adjusted so that it is from 45 to 80 wt.-%, preferably from 50 to 78 wt.-%, and more preferably from 60 to 75 wt.-%, based on the total weight of the suspension. According to another embodiment, the catalyst is selected from the group consisting of iron sulphate, sodium hypophosphite, iron phthalocyanine, sodium tungstate, or a mixture thereof. According to still another embodiment, the peroxide of step ii) is provided in an amount from 0.1 to 50 wt.-%, preferably from 0.2 to 40 wt.-%, and more preferably from 1 to 30 wt.-%, based on the total amount of the high molecular weight CMC of step i).

According to one embodiment, after step iv) and before step v) the viscosity of the mixture Obtained in step iv) is adjusted to a Brookfield viscosity between 200 and 1500 mPa·s, measured at the reaction temperature, preferably by adding a further part of the remaining part of the high molecular weight carboxymethyl cellulose and/or a further part of the remaining part of the peroxide and/or a further part of the remaining part of the catalyst in one or more steps to the mixture obtained in step iv). According to another embodiment, in step v) the remaining part of the high molecular weight carboxymethyl cellulose and/or the remaining part of the peroxide and/or the remaining part of the catalyst is/are added in one or more steps to the mixture obtained in step iv) until the mixture of step v) contains from 25 to 45 wt.-% depolymerized carboxymethyl cellulose, preferably from 30 to 40 wt.-%, based on the total weight of the mixture of step v), and/or until the mixture of step v) has a Brookfield viscosity between 50 and 5000 mPa·s at 20° C., preferably between 1000 and 3000 mPa·s at 20° C., and most preferably between 1500 to 2500 mPa·s at 20° C.

It should be understood that for the purpose of the present invention, the following terms have the following meaning.

Throughout the present document, the "degree of carboxylation" is specified in respect to the total amount of hydroxyl groups per unmodified monomer unit of the original polysaccharide. A "degree of carboxylation" of 1 means that one of the three hydroxyl groups of the unmodified monomer unit of the original polysaccharide is carboxylated.

The term "depolymerized carboxymethylcellulose" (depolymerized CMC) refers to a carboxymethylcellulose (CMC), which is obtained by depolymerisation or degradation of a carboxymethylcellulose having a molecular weight $M_w$ of more than 40000 g/mol (measured by Gel Permeation, GPC).

"Ground calcium carbonate" (GCC) in the meaning of the present invention is a calcium carbonate obtained from natural sources, such as limestone, marble, calcite or chalk, and processed through a wet and/or dry treatment such as grinding, screening and/or fractionating, for example, by a cyclone or classifier.

"Precipitated calcium carbonate" (PCC) in the meaning of the present invention is a synthesized material, obtained by precipitation following reaction of carbon dioxide and lime in an aqueous environment or by precipitation of a calcium and carbonate ion source in water. PCC may be vaterite, calcite or aragonite.

"Modified calcium carbonate" (MCC) in the meaning of the present invention may feature a natural ground or precipitated calcium carbonate with an internal structure modification or a surface-reaction product.

For the purpose of the present invention, a "mineral pigment" encompasses an inorganic substance that is solid at room temperature, i.e. at a temperature of 20° C.±2° C., insoluble in water, i.e. less than 1 wt.-% of the substance is soluble in water at room temperature, and has a definite chemical composition and can be crystalline or amorphous or mixtures thereof.

A "mineral pigment material" in the meaning of the present application may encompass materials such as calcium carbonate such as calcite, aragonite, marble, limestone and chalk, talc, dolomite, mica, titanium dioxide, aluminiumtrihydrate such as Gibbsit, Bayerit, magnesium hydroxide such as brucite, hydromagnesite, etc.

Throughout the present document, the "particle size" of a mineral pigment material or a calcium carbonate product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ value between 0.2 and 5 μm, a Sedigraph 5100 device from the company Micrometeritics, USA, can be used.

The term "polydispersity index" as used in the context of the present invention is a measure of the distribution of molecular weights in a given polymer sample. When the polydispersity index is one, the molecular weight distribution of all polymers in the sample is monodisperse, i.e. all polymers have the same chain length, and thus, molecular weight, However, for real polymers, the polydispersity index is commonly greater than one and represents the ratio of $M_w/M_n$ which is the weight average molecular weight divided by the number average molecular weight of the polymer.

For the purpose of the present invention, the term "viscosity" or "Brookfield viscosity" refers to Brookfield viscosity. The Brookfield viscosity is for this purpose measured by a Brookfield (Typ RVT) viscosimeter at 20° C.±2° C. (except if is indicated "at reaction temperature") at 100 rpm using an appropriate spindle and is specified in mPa·s.

A "suspension" or "slurry" in the meaning of the present invention comprises insoluble solids and water, and optionally further additives and usually contains large amounts of solids and, thus, is more viscous and can be of higher density than the liquid from which it is formed.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

The inventive process for preparing an aqueous suspension comprises the steps of (a) providing a mineral pigment material, (b) providing a depolymerized carboxymethylcellulose having a degree of carboxylation in the range from 0.2 to 2.2, a molecular weight in the range from 5000 to 40000 g/mol and a polydispersity index in the range from 2 to 10, and (c) mixing the depolymerized carboxymethylcellulose of step (b), the mineral pigment material of step (a) and water to form an aqueous suspension. The mineral pigment material is added in an amount from 10 to 80 wt.-%, based on the total weight of the suspension, and the depolymerized carboxymethylcellulose is added in an amount from 0.05 to 5.0 wt.-%, based on the total weight of the mineral pigment material in the suspension, and such that the Brookfield viscosity of the aqueous suspension is between 40 and 2000 mPa·s at 20° C. The depolymerized carboxymethyl cellulose is prepared by depolymerizing a high molecular weight carboxymethylcellulose in a process comprising the steps of (i) providing a high molecular weight carboxymethylcellulose having a molecular weight of more than 40000 g/mol and a degree of carboxylation in the range from 0.2 to 2.0, (ii) providing a peroxide selected from hydrogen peroxide and/or an alkali metal salt thereof, (iii) providing a catalyst, (iv) mixing at least one part of the high molecular weight carboxymethylcellulose of step i) and/or at least one part of the peroxide of step ii) and/or at least one part of the catalyst of step iii) and water in any order at a reaction temperature from 50 to 85° C., and (v) adding the remaining part of the high molecular weight carboxymethyl cellulose and/or the remaining part of the peroxide and/or the remaining part of the catalyst in one or more steps to the mixture obtained in step (iv) until the mixture of step (v) contains from 10 to 60 wt.-% depolymerized carboxymethylcellulose, based on the total weight of the mixture of step (v), and until the mixture of step (v) at the same time has a Brookfield viscosity between 30 and 10000 mPa·s at 20° C., wherein during step (v) the Brookfield viscosity of the mixture is maintained between 200 and 1500 mPa·s, measured at the reaction temperature.

In the following the details and preferred embodiments of the inventive process will be set out in more detail. It is to be understood that these technical details and embodiments also apply to the inventive suspension and its use.

Step a)

According to step a) of the inventive process, a mineral pigment material is provided. The mineral pigment material is added in an amount from 10 to 80 wt.-%, based on the total weight of the suspension.

Examples for suitable mineral pigment materials are calcium carbonate such as calcite, marble, limestone and chalk, talc, dolomite, mica, or titanium dioxide, aluminium hydroxide and magnesium hydroxide.

According to one embodiment the mineral pigment material is a calcium carbonate containing material, preferably selected from calcium carbonate, calcium carbonate containing minerals, mixed carbonate based fillers, or mixtures thereof.

According to another embodiment, the mineral pigment material is kaolin, talc, gypsum, lime, magnesia, titanium dioxide, satin white, aluminium trioxide, aluminium trihydroxide, silica, mica, or mixtures thereof.

According to a preferred embodiment of the present invention, the mineral pigment material is a calcium carbonate. Calcium carbonate may be selected from ground calcium carbonate, also named heavy calcium carbonate, precipitated calcium carbonate, also named light calcium carbonate, modified calcium carbonate, or mixtures thereof.

Ground (or natural) calcium carbonate (GCC) is understood to be a naturally occurring firm of calcium carbonate, mined from sedimentary rocks such as limestone or chalk, or from metamorphic marble rocks. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable.

Ground calcium carbonate is almost exclusively of the calcitic polymorph, which is said to be trigonal-rhombohedral and represents the most stable of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

According to one embodiment of the present invention, the source of ground calcium carbonate (GCC) is selected from marble, chalk, calcite, dolomite, limestone, or mixtures thereof. Preferably, the source of ground calcium carbonate is selected from marble and dolomitic marble.

According to one embodiment of the present invention the GCC is obtained by dry grinding. According to another embodiment of the present invention the GCC is obtained by wet grinding and optionally subsequent drying.

In general, the grinding step can be carried out with any conventional grinding device, for example, under conditions such that comminution predominantly results from impacts with a secondary body, i.e. in one or more of a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by wellknown processes, e.g. by flocculation, filtration or forced evaporation prior to drying. The subsequent step of drying may be carried out in a single step such as spray drying, or in at least two steps. It is also common that such a mineral material undergoes a beneficiation step (such as a flotation, bleaching or magnetic separation step) to remove impurities.

According to one embodiment, the calcium carbonate containing comprises one ground calcium carbonate. According to another embodiment of the present invention, the calcium carbonate containing material comprises a mixture of two or more ground calcium carbonates selected from different sources of ground calcium carbonate. For example, the at least one ground calcium carbonate may comprise one GCC selected from dolomite and one GCC selected from marble.

According to another embodiment, the calcium carbonate containing material consists of only one ground calcium carbonate. According to another embodiment of the present invention, the calcium carbonate containing material consists of a mixture of two or more ground calcium carbonates selected from different sources of ground calcium carbonate.

According to one embodiment, the calcium carbonate containing material comprises at least one ground calcium carbonate in combination with at least one precipitated calcium carbonate.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or wormlike form. Vaterite belongs to the hexagonal crystal system. The obtained PCC slurry can be mechanically dewatered and dried.

According to one embodiment of the present invention, the calcium carbonate containing material comprises one precipitated calcium carbonate. According to another embodiment of the present invention, the calcium carbonate containing material comprises a mixture of two or more precipitated calcium carbonates selected from different crystalline forms and different polymorphs of precipitated calcium carbonate. For example, the at least one precipitated calcium carbonate may comprise one PCC selected from S-PCC and one PCC selected from R-PCC.

According to another embodiment, the calcium carbonate containing material consists of only one precipitated calcium carbonate. According to another embodiment of the present invention, the calcium carbonate containing material consists of a mixture of two or more precipitated calcium carbonates selected from different crystalline forms and different polymorphs of precipitated calcium carbonate.

A modified calcium carbonate may feature a natural ground or precipitated calcium carbonate with a surface and/or internal structure modification, e.g., with phosphoric acid.

According to one embodiment of the present invention, the calcium carbonate containing material comprises one modified calcium carbonate. According to another embodiment of the present invention, the calcium carbonate containing material comprises a mixture of two or more modified calcium carbonates having different surface and/or internal structure modifications.

According to one embodiment of the present invention, the calcium carbonate containing material consists of one modified calcium carbonate. According to another embodiment of the present invention, the calcium carbonate containing material consists of a mixture of two or more modified calcium carbonates having different surface and/or internal structure modifications.

According to another embodiment the calcium carbonate containing material is a mixture of ground calcium carbonate and/or precipitated calcium carbonate and/or modified calcium carbonate.

According to one embodiment of the present invention, the calcium carbonate containing minerals comprise dolomite.

According to a preferred embodiment, the mixed carbonate based fillers are selected from calcium associated with magnesium and analogues or derivatives, various matter such as clay or talc or analogues or derivatives, and mixtures of these fillers, such as, for example, talc-calcium carbonate or calcium carbonate-kaolin mixtures, or mixtures of natural calcium carbonate with aluminium hydroxide, mica or with synthetic or natural fibers or co-structures of minerals such as talc-calcium carbonate or talc-titanium dioxide or calcium carbonate-titanium dioxide co-structures.

According to one embodiment of the present invention, the mineral pigment material is in form of particles having a weight median particle size $d_{50}$ from 0.1 to 100 μm, preferably from 0.25 to 50 μm, more preferably from 0.3 to 5 μm, and most preferably from 0.4 to 3.0 μm.

According to one embodiment of the present invention, the mineral pigment material is added in an amount from 40 to 80 wt.-%, preferably from 45 to 80 wt.-%, more preferably from 50 to 78 wt.-%, and most preferably from 60 to 75 wt.-%, based on the total weight of the suspension.

Step b)

According to step b) of the inventive process, a depolymerized carboxymethylcellulose having a degree of carboxylation in the range from 0.2 to 2.2, a molecular weight in the range from 5000 to 40000 g/mol and a polydispersity index in the range from 2 to 10 is provided. The depolymerized carboxymethylcellulose is added in an amount from 0.05 to 5 wt.-%, based on the total weight of the mineral pigment material in the suspension, and such that the Brookfield viscosity of the aqueous suspension is between 40 and 2000 mPa·s at 20° C.

Carboxymethylcellulose (CMC) may be prepared from cellulose by reaction with monochloroacetic acid in the presence of caustic soda to form the sodium salt of carboxymethylcellulose. Each repeating D-glycose unit contains three hydroxyl groups theoretically capable of etherification, to give a theoretically maximum charge density of three carboxylic groups per monomer unit (i.e., a theoretically degree of substitution of three).

According to one embodiment of the present invention, the depolymerized carboxymethylcellulose has a degree of carboxylation in the range from 0.5 to 1.8, and preferably from 0.6 to 1.4, for example 1.2. According to another embodiment of the present invention, the depolymerized carboxymethylcellulose has a degree of carboxylation of about 0.8 or about 1.2. According to still another embodiment of the present invention, the depolymerized carboxymethyl cellulose comprises a blend of the two degrees of carboxylation, for example a blend of a carboxylation degree of about 0.8 and about 1.2.

The molecular weight of the carboxymethylcellulose can be adjusted by the treatment with hydrogen peroxide ($H_2O_2$). Reference is made to DE 1 543 116 A1 describing a method for the preparation of low viscous, water-soluble CMC by oxidative degradation with $H_2O_2$ (hydrogen peroxide) and to DE 44 11 681 A1 describing the dependency of the degradation of polysaccharide ether on the amount of oxidizing agent, temperature and duration of the treatment. However, the conventionally used depolymerisation or degradation processes with hydrogen peroxide do not allow the preparation of highly concentrated carboxymethylcellulose solutions.

According to the process of the present invention, the depolymerized carboxymethylcellulose is obtained by depolymerizing a high molecular weight carboxymethylcellulose in a process comprising the following steps:

i) providing a high molecular weight carboxymethylcellulose having a molecular weight of more than 40000 g/Mol and a degree of carboxylation in the range from 0.2 to 2.0, ii) providing a peroxide selected from hydrogen peroxide and/or an alkali metal salt thereof, iii) providing a catalyst, iv) mixing at least one part of the high molecular weight carboxymethylcellulose of step i) and/or at least one part of the peroxide of step ii) and/or at least one part of the catalyst of step iii) and water in any order at a reaction temperature from 50 to 85° C., and v) adding the remaining part of the high molecular weight carboxymethylcellulose and/or the remaining part of the peroxide and/or the remaining part of the catalyst in one or more steps to the mixture obtained in step iv) until the mixture of step v) contains from 10 to 60 wt.-% depolymerized carboxymethylcellulose, based on the total weight of the mixture of step v), and until the mixture of step v) at the same time has a Brookfield viscosity between 30 and 10000 mPa·s at 20° C., wherein during step v) the Brookfield viscosity of the mixture is maintained between 200 and 1500 mPa·s, measured at the reaction temperature.

The high molecular weight carboxymethylcellulose can have a molecular weight from 50000 to 700000 g/mol, preferably from 100000 to 500000 g/mol, and more preferably from 200000 to 400000 g/mol. The high molecular weight CMC can have the same degree of carboxylation as the depolymerized CMC of process step b) or can have a degree of carboxylation which is smaller than that of the depolymerized CMC.

According to one embodiment of the present invention, the peroxide is hydrogen peroxide. According to another embodiment the peroxide is an alkali metal peroxide, preferably sodium peroxide. According to still another embodiment, the peroxide is a mixture of hydrogen peroxide and one or more alkali metal salts thereof.

According to one embodiment of the present invention, the catalyst is selected from the group consisting of iron sulphate, sodium hypophosphite, iron phthalocyanine, sodium tungstate, or a mixture thereof.

The amount of the high molecular weight CMC of step i), the peroxide of step ii) and the catalyst of step iii) is selected such that a depolymerized CMC is obtained having a molecular weight in the range of 5000 to 40000 g/mol and a polydispersity index in the range from 2 to 10.

According to one embodiment of the present invention, the peroxide of step ii) is provided in an amount from 0.1 to 50 wt.-%, preferably from 0.2 to 40 wt.-%, and more preferably from 1 to 30 wt.-%, based on the total amount of the high molecular weight CMC of step i). The peroxide can be provided in form of an aqueous solution having a concentration from 3 to 50 wt.-%, preferably from 25 to 40 wt.-%, based on the total amount of the aqueous solution.

According to a further embodiment of the present invention, the catalyst of step iii) is provided in an amount from 0.001 to 0.020 wt.-%, preferably from 0.002 to 0.015 wt.-%, and most preferably from 0.004 to 0.010 wt.-%, based on the total amount of the high molecular weight CMC of step i).

According to one embodiment of the present invention, in process step iv) at least one part of the high molecular weight CMC and at least one part of the peroxide and at least one part of the catalyst and water are mixed in any order. For example, the at least one part of the high molecular weight CMC can be mixed with water in a first step, and in a second step a mixture of the at least one part of the peroxide and the at least one part of the catalyst can be added to the CMC/water mixture. The at least one part of the peroxide and the at least one part of the catalyst can be added together to the CMC/water mixture or the at least one part of the catalyst can be added in a first step to the CMC/water mixture, and the at least one part of the peroxide can be added in a second step to said mixture. Alternatively, the at least one part of the peroxide and the at least one part of the catalyst can be mixed with water in a first step, and in a second step the at least one part of the high molecular weight CMC can added to the peroxide/catalyst/water mixture. Alternatively, the at least one part of the high molecular weight CMC, the at least one part of the peroxide, and the at least one part of the catalyst can be mixed with water in one step.

According to another embodiment of the present invention, in process step iv) the at least one part of the peroxide and the at least one part of the catalyst and water are mixed in any order. According to still another embodiment, in process step iv) the at least one part of the high molecular weight CMC and the at least one part of the peroxide and water are mixed in any order. According to still another embodiment, in process step iv) the at least one part of the high molecular weight CMC and the at least one part of the catalyst and water are mixed in any order. According to still another embodiment, in process step iv) the at least one part of the catalyst and water are mixed.

According to the present invention, the expression "at least one part" means that a part of the provided compound or all of the provided compound is added. Accordingly, the expression "remaining part" refers to the part that is left over after the at least one part of the provided compound has been added. In the event that no part of the compound was added in process step iv), the remaining part is all of the provided compound.

According to one embodiment, all of the provided peroxide is added in process step iv). According to an alternative embodiment, 5%, 10%, 20%, 30%, 40% or 50% of the provided peroxide is added in process step iv). According to still an alternative embodiment, all of the provided peroxide is added in process step v).

According to one embodiment, all of the provided catalyst is added in process step iv). According to an alternative embodiment, 5%, 10%, 20%, 30%, 40% or 50% of the provided catalyst is added in process step iv). According to still an alternative embodiment, all of the provided catalyst is added in process step v).

According to one embodiment, 5%, 10%, 20%, 30%, 40% or 50% of the provided high molecular weight CMC is added in process step iv). According to an alternative embodiment, all of the provided high molecular weight CMC is added in process step v). In the event that at least one part of the high molecular weight CMC is added in process step iv), the at least one part of the high molecular weight CMC may be selected such that the mixture obtained in step iv) can be stirred. For example, the at least one part of the high molecular weight CMC may be selected such that the mixture obtained in step iv) has a Brookfield viscosity between 200 and 1500 mPa·s measured at the reaction temperature.

According to one embodiment of the present invention, in step v) the remaining part of the high molecular weight CMC and/or the remaining part of the peroxide and/or the remaining part of the catalyst is/are added in one or more steps to the mixture obtained in step iv) until the mixture of step v) contains from 25 to 45 wt.-% depolymerized CMC, preferably from 30 to 40 wt.-%, based on the total weight of the mixture of step v), and/or until the mixture of step v) has a Brookfield viscosity between 50 and 5000 mP·s at 20° C., preferably between 1000 to 3000 mPa·s at 20° C., and most preferably between 1500 to 2500 mPa·s at 20° C.

According to one embodiment of the present invention, the remaining part of the high molecular weight CMC and/or the remaining part of the peroxide and/or the remaining part of the catalyst is/are added to the mixture obtained in step v) in 1 to 20 steps, preferably in 1 to 15 steps, more preferably in 2 to 12 steps, for example, in 3 to 5 or 10 to 12 steps.

According to one embodiment of the present invention, the remaining part of the high molecular weight CMC and/or the remaining part of the peroxide and/or the remaining part of the catalyst is/are added to the mixture obtained in step v) continuously. In other words, the high molecular weight CMC and/or the remaining part of the peroxide and/or the remaining part of the catalyst is/are added to the mixture obtained in step v) in small increments over a certain time period.

According to an exemplary embodiment of the present invention, the remaining part of the high molecular weight CMC is added in 2 to 12 steps and the remaining part of the peroxide is added continuously.

Process step v) can be carried out in a batch process or in a continuous process. A continuous process can be preferably carried out in a cascade mode of at least 2 vessels, preferably in a cascade mode of 2 to 10 vessels.

According to the present invention, during process step v) the Brookfield viscosity of the mixture is maintained between 200 and 1000 mPa·s, measured at the reaction temperature. The skilled person knows that the Brookfield viscosity of the mixture can be controlled by the amount of high molecular CMC that is added. For example, if a certain amount of high molecular weight CMC is mixed with the peroxide, the catalyst and water, the Brookfield viscosity of the mixture will be reduced due to the depolymerisation reaction that will take place in presence of the peroxide and the catalyst. In order to maintain the Brookfield viscosity of the mixture in the desired range, further high molecular weight CMC may be added, which will increase the viscosity of the mixture. Furthermore, additional peroxide and, if necessary, catalyst can be added to the mixture to depolymerized the freshly added high molecular weight CMC. In case a mixture of peroxide, catalyst and water is provided, high molecular weight CMC can be added to said mixture until the Brookfield viscosity of the mixture is in the desired range. Furthermore, additional high molecular weight CMC, peroxide and, if necessary, catalyst can be added in a ratio to said mixture such that the Brookfield viscosity of the mixture is maintained in the desired range.

According to one optional embodiment of the present invention, after step iv) and before step v) the viscosity of the mixture obtained in step iv) is adjusted to a Brookfield viscosity between 200 and 1500 mPa·s, measured at the reaction temperature, preferably by adding a further part of the remaining part of the high molecular weight carboxymethyl cellulose and/or a further part of the remaining part of the peroxide and/or a further part of the remaining part of the catalyst in one or more steps to the mixture obtained in step iv). According to one embodiment, 5%, 10%, 20%, 30%, 40% or 50% of the remaining part of the high molecular weight carboxymethyl cellulose and/or a the remaining part of the peroxide and/or a the remaining part of the catalyst is/are added in one or more steps to the mixture obtained in step iv).

According to another optional embodiment of the present invention, the mixture obtained in step v) is cooled to a temperature below 75° C.

According to one embodiment of the present invention, the final mixture obtained in step v) contains the depolymerized CMC of process step b), i.e. a depolymerized CMC having a degree of carboxylation in the range from 0.2 to 2.2, a molecular weight in the range from 5000 to 40000 g/mol, and a polydispersity index in the range from 2 to 10.

The depolymerized CMC mixture obtained in process step v) may be employed in the aqueous suspension of the present invention without any further purification. According to an optional embodiment, the depolymerized carboxymethylcellulose mixture obtained in process step v) is purified. Alternatively or additionally, the depolymerized carboxymethylcellulose mixture obtained in process step v) can be diluted or concentrated.

According to one embodiment of the present invention, the depolymerized carboxymethylcellulose has a molecular weight in the range from 8000 to 35000 g/mol, and most preferably in the range from 10000 to 20000 g/mol.

According to one embodiment of the present invention the depolymerized carboxymethyl cellulose has a polydispersity index from 2 to 5, preferably from 2.5 to 4.5, and more preferably from 3 to 4.

According to the present invention, the expression "a" depolymerized carboxymethylcellulose means that one or more types of depolymerized carboxymethylcellulose are provided in process step b). According to one embodiment, only one type of depolymerized carboxymethylcellulose is provided in process step b). According to another embodiment, a mixture of at least two types depolymerized carboxymethylcellulose is provided in process step b).

Surprisingly, the inventors found that the aforementioned depolymerization process of high molecular weight of CMC allows the direct preparation of depolymerized carboxymethylcellulose solutions with a high concentration of carboxymethylcellulose.

Accordingly, energy consuming concentration steps such as thermal concentration or ultrafiltration can be avoided allowing increased solids of mineral pigment material suspension without further concentration. Moreover, the inventors found that said highly concentrated depolymerized CMC solution can be directly employed as dispersing or grinding aid in aqueous mineral pigment suspensions. Surprisingly, the inventors also found that depolymerized carboxymethylcellulose as defined above can control and adjust the viscosity of a high solids pigment material suspension and/or can improve or facilitate grinding of such suspension. Furthermore, the depolymerized carboxymethylcellulose of the present invention can be easily prepared and stored without any special safety precautions.

The depolymerized carboxymethylcellulose can be provided as solution or dry material. For example, the depolymerized carboxymethylcellulose can be in form of an aqueous solution having a carboxymethylcellulose concentration from 10 to 60 wt.-%, preferably from 25 to 45 wt.-%, and more preferably from 30 to 40 wt.-%, based on the total weight of the aqueous solution.

According to one embodiment of the present invention, in step b) the depolymerized carboxymethyl cellulose is provided in form of a mixture containing 10 to 60 wt.-%, preferably from 25 to 45 wt.-%, and more preferably from 30 to 40 wt.-%, depolymerized CMC, based on the total weight of the mixture, and having a Brookfield viscosity between 30 and 10000 mPa·s at 20° C., preferably between 50 and 5000 mPa·s at 20° C., more preferably between 1000 and 3000 mPa·s at 20° C., and most preferably between 1500 and 2500 mPa·s at 20° C.

According to one embodiment of the present invention, the depolymerized carboxymethylcellulose is added in an amount from 0.05 to 3.0 wt.-%, preferably from 0.1 to 2.0 wt.-%, and more preferably from 0.2 to 1.0 wt.-%, based on the total weight of the mineral pigment material in the suspension. According to one embodiment of the present invention, the depolymerized CMC is added in an amount such that the Brookfield viscosity of the aqueous suspension is between 60 and 2000 mPa·s at 20° C., and preferably between 80 and 700 mPa·s at 20° C.

According to one embodiment of the present invention, the depolymerized carboxymethylcellulose of the present invention has a pH from 4.5 to 12, preferably from 7 to 11, and more preferably from 8.0 to 10.5.

According to an optional embodiment of the present invention, the mixture obtained in process step v) is neutralized.

According to one optional embodiment of the present invention, the carboxylic groups of the depolymerized carboxymethylcellulose are at least partly neutralized by one or more monovalent and/or polyvalent cations. According to a preferred embodiment, the monovalent cations are selected from $Li^+$, $Na^+$, $K^+$, or mixtures thereof. Preferably, the polyvalent cations are selected from $Sr^{2+}$, $Ca^{2+}$, $Mg^{2+}$, or mixtures thereof, and most preferably from $Ca^{2+}$ added in feint of $Ca(OH)_2$ in suspension and/or solution. According to a preferred embodiment, the carboxylic groups of the depolymerized carboxymethylcellulose are at least partly neutralized by $Ca^{2+}$ cations and the $Ca^{2+}$ is produced in situ by addition of partially neutralized polysaccharides and/or addition of an acid. Additionally or alternatively, the carboxylic groups of the depolymerized carboxymethylcellulose are at least partly neutralized by one or more trivalent cations, preferably selected from $Al^{3+}$ and/or $Fe^{3+}$.

The monovalent cations and/or polyvalent cations can also be added during the preparation of the depolymerized carboxymethylcellulose. For example, monovalent cations may be added during the optional neutralization of the depolymerized carboxymethylcellulose in form of a base such as NaOH or KOH.

The monovalent cations may be added in the form of an aqueous salt solution, suspension or powder, and preferably in the form of a solution. The polyvalent cations may be added in the form of an aqueous salt solution, suspension or powder, and preferably in the form of a suspension.

The polyvalent cations may also be produced in-situ, e.g., by addition of an acid and/or acidic reacting salt and/or partially neutralized polysaccharide. The polyvalent cations may be added instead of monovalent cations or in combination with monovalent cations.

According to a preferred optional embodiment, the carboxylic groups of the depolymerized carboxymethylcellulose are at least partly neutralized by adding prior and/or during and/or after process steps i) to v) one or more polyvalent cations, in situ formed, by adding an acid, preferably $H_3PO_4$, or acidic reacting salt, for example, $NaH_2PO_4$, preferably $CaHPO_4$.

The acid or acidic reacting salt may be added in an amount from 50 to 500 ppm, based on the total weight of the solids in the suspension, preferably in an amount from 200 to 400 ppm, preferably in the form of an aqueous solution or suspension.

It was found by the inventors that the addition of monovalent cations, and in particular the addition of polyvalent cations, to the suspension provides further advantages and especially provides improved adsorption properties of the depolymerized carboxymethylcellulose to the surface of the mineral. This may enhance the effectiveness of the depolymerized carboxymethylcellulose of the present invention as dispersing agent and/or grinding aid. The inventors of the present invention also found that the addition of a combination of monovalent cations and polyvalent cations may enhance the effectiveness of the modified polysaccharide as dispersing agent and/or grinding aid particularly well.

According to one embodiment, one or more monovalent and/or one or more polyvalent cations are added in an amount from 0.1 to 5 wt.-%, preferably from 2 to 3 wt.-%, based on the total weight of the dry partially or fully neutralized salt of the depolymerized CMC. $Ca(OH)_2$ may be added in an amount from 50 to 500 ppm, based on the total weight of the mineral pigment material in the aqueous suspension, preferably from 200 to 300 ppm.

Step c)

According to process step c) the depolymerized carboxymethylcellulose of step b), the mineral pigment material of step a) and water are mixed to firm an aqueous suspension.

According to one embodiment, in step c) the depolymerized carboxymethylcellulose is mixed with the water in a first step, and the mineral pigment material is added to the carboxymethylcellulose/water mixture in a second step. According to another embodiment, in step c) the mineral pigment material is mixed with the water in a first step, and the depolymerized carboxymethylcellulose is added to the mineral pigment material/water mixture in a second step. According to still another embodiment, in step c) the depolymerized carboxymethylcellulose and the mineral pigment material are added simultaneously to the water.

The skilled person will adapt the mixing conditions such as the mixing speed and temperature according to his process equipment. For example, the mixing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany.

According to one embodiment of the present invention, process step c) is carried out using a ploughshare mixer.

Process step c) may be carried out at room temperature, i.e. at a temperature of 20° C.±2° C. or at other temperatures. According to one embodiment of the present invention, method step c) is carried out for at least 1 s, preferably for at least 1 min, e.g. for at least 2 min.

According to a further aspect of the present invention, an aqueous pigment particle suspension, obtainable by the process according to the present invention is provided. The aqueous suspension of the present invention can have a value from 7 to 12, preferably from 8 to 11, and more preferably from 8.5 to 10.5. If necessary, the pH of the suspension may be adjusted by all means known in the art.

According to one preferred embodiment, the aqueous suspension of the present invention does not include an additional dispersing agent and/or grinding aid. According to another preferred embodiment, the aqueous suspension of the present invention does not include a purely petro-chemistry based dispersing agent and/or grinding aid such as petro-chemistry based homopolymers or copolymers of polycarboxylic acid salts based on, for example, acrylic acid, methacrylic acid, maleic acid, fumaric acid or itaconic acid and acrylamide or mixtures thereof.

The aqueous suspension according to the present invention can be used in paper, plastics, paint, food, feed, pharmaceuticals, drinking water and/or agriculture applications. According to a preferred embodiment, the aqueous suspension according to the present invention is used in the wet end process of a paper machine, in cigarette paper and/or coating applications, as a support for rotogravure and/or offset and/or ink jet printing and/or flexography and/or electrophotography and/or decoration surfaces.

According to one aspect of the present invention, pigment particles obtainable by drying the aqueous suspension of the present invention, and optionally surface treating the dried particles, are provided. For example, the aqueous suspension can be dried by spray-drying, evaporation, nanofiltration, or centrifugation. Preferably, the pigment particles are obtainable by drying the aqueous suspension of the present invention by spray-drying. The term "dry product" is understood to refer to pigment particles having a total surface moisture content of less than 0.5 wt.-%, preferably less than 0.2 wt.-%, and more preferably less than 0.1 wt.-%, based on the total weight of the pigment particles.

Surface treatment of the pigment particles can be, for example, carried out by treating or coating the particles with a hydrophobising surface treatment agent such as, e.g. an aliphatic carboxylic acid or a siloxane. The pigment particles may also be treated or coated to become cationic or anionic with, for example, with a sodium polyacrylate or polyDAD-MAC (polydiallyldimethylammonium chloride).

According to one aspect of the present invention, the pigment particles of the present invention are used in plastics, paint and/or sealant application.

Further, Optional Process Steps

According to an optional embodiment, the mixing step c) is carried out under particle dividing conditions. The term "dividing" as used in the present invention means that particles are split into smaller particles. This may be done by grinding, e.g. using a ball mill, a hammer mill, a rod mill, a vibrating mill, a roll crusher, a centrifugal impact mill, a vertical bead mill, an attrition mill, a pin mill, a hammer mill, a pulveriser, a shredder, a de-clumper, or a knife cutter. However, any other device that is able to divide pigment particles formed during process step c) into smaller particles may be used. The skilled person will adapt the particle dividing conditions according to his process equipment.

According to another optional embodiment, the process according to the present invention further comprises the step d) of grinding the suspension obtained in step c).

The grinding process may be undertaken by all the techniques and grinders well known to the man skilled in the art for wet grinding. The grinding step may be carried out with any conventional grinding device, for example, under conditions such that refinement predominantly results from impacts with a secondary body, i.e. in one or more of: a ball mill, a rod mill, a vibrating mill, a centrifugal impact mill, a vertical bead mill, an attrition mill, or other such equipment known to the skilled person. The grinding step d) may be carried out in batch or continuously, preferably continuously.

According to one optional embodiment, the carboxylic groups of the depolymerized carboxymethylcellulose are at least partly neutralized by adding prior and/or during and/or after grinding step d) one or more monovalent cations and/or one or more polyvalent cations as defined above.

According to one embodiment of the present invention, the grinding step d) is carried out at a temperature from 30 to 110° C., preferably from 40 to 100° C.

In one preferred embodiment of the present invention, grinding step d) is carried out until the fraction of pigment particles having a particle size of less than 1 µm is greater than 10 wt.-%, preferably greater than 20 wt.-%, more preferably greater than 30 wt.-%, and most preferably greater than 50 wt.-%, based on the total weight of the pigment particles, as measured with a Sedigraph 5100.

Additionally or alternatively, grinding step d) is carried out until the fraction of pigment particles having a particle size of less than 2 µm is greater than 20 wt.-%, preferably greater than 40 wt.-%, more preferably greater than 60 wt.-%, and most preferably greater than 90 wt.-%, based on the total weight of the pigment particles, as measured with a Sedigraph 5100.

Additionally or alternatively, grinding step d) is carried out until the fraction of pigment particles having a particle size of less than 0.2 µm is greater than 1 wt.-%, preferably greater than 5 wt.-%, more preferably greater than 10 wt.-%, and most preferably greater than 15 wt.-%, based on the total weight of the pigment particles, as measured with a Sedigraph 5100.

The mineral pigment particles obtained by the grinding step d) may have a weight median particle diameter $d_{50}$, measured according to the sedimentation method, in the range of from 0.1 µm to 10 µm, preferably from 0.5 µm to 8 µm and most preferably from 0.8 µm to 6 µm, for example from 1.0 µm to 5.5 µm. Additionally or alternatively, the mineral pigment particles obtained in step d) may have a $d_{98}$ of less than 25 µm, preferably of less than 20, more preferably of less than 15, and most preferably of less than 10 µm. Most preferably, less than 3 ppm of the mineral pigment particles obtained by the grinding step d) have a particle size between 1 and 2 micron on a 45 micron screen.

According to one embodiment of the present invention, the mixing step c) is carried out under particle dividing conditions and/or the process according to the present invention further comprises the step d) of grinding the suspension obtained in step c).

Optionally, the solids content of the aqueous suspension obtained by the process according to the present invention can be adjusted. The solids content of the aqueous suspension can be adjusted by the methods known to the skilled person. To adjust the solids content of an aqueous mineral material comprising suspension, the suspension may be partially or fully dewatered by a filtration, centrifugation or thermal separation process. For example, the suspension may be partially or fully dewatered by a filtration process such as nanofiltration or a thermal separation process such as an evaporation process. Alternatively, water may be added to the solid mineral material until the desired solids content is obtained. Additionally or alternatively, a suspension having an appropriate lower content of solid particles may be added to the particulate material of the mixed suspension until the desired solid content is obtained. The solids content of the aqueous suspension obtained by the inventive process can also be adjusted by a concentration methods known to the skilled person. The concentration of the aqueous suspension may be achieved by means of a thermal process, for example, in an evaporator under ambient, atmospheric pressure or at reduced pressure, or by means of a mechanical process, for example, in a filter press, such as nanofiltration, and/or centrifuge.

According to one optional embodiment, the process according to the present invention further comprises the step of adjusting the solids content of the suspension obtained in step c). According to one embodiment of the present invention, the solids content of the suspension obtained in step c) is adjusted so that it is from 45 to 80 wt.-%, preferably from 50 to 78 wt.-%, and more preferably from 60 to 75 wt.-%, based on the total weight of the suspension.

According to a preferred optional embodiment, the solids content of the aqueous suspension obtained by the process step c) is concentrated by a thermal process so that it is from 45 to 80 wt.-%, preferably from 50 to 78 wt.-%, and more preferably from 60 to 75 wt.-%, based on the total weight of the aqueous suspension. According to a preferred embodiment, the thermal process is thermal drying and/or is carried out under reduced pressure.

The scope and interest of the invention will be better understood based on the following examples which are intended to illustrate certain embodiments of the invention and are non-limitative.

EXAMPLES

1. Measurement Methods

In the following, measurement methods implemented in the examples are described.

Brookfield Viscosity

The Brookfield viscosity of the pigment particles suspension was measured after one hour of production and after one minute of stirring at 20° C.±2° C. at 100 rpm by the use of a Brookfield viscometer type RVT equipped with an appropriate disc spindle, for example spindle 2 to 5.

The Brookfield viscosity of the CMC solution was measured during depolymerisation at the reaction temperature and at 100 rpm by the use of a Brookfield viscometer type RVT equipped with a disc spindle 5.

The Brookfield viscosity of the depolymerized CMC solution was measured after depolymerization at 20° C.±2° C. at 100 rpm by the use of a Brookfield viscometer type RVT equipped with a disc spindle 5 or 6.

Particle Size Distribution

The particle size distribution of the pigment particles was measured using a Sedigraph 5100 from the company Micromeritics, USA. The method and the instrument are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics. For the measurement of dispersed samples, no further dispersing agents were added.

Solids Content of an Aqueous Suspension

The suspension solids content (also known as "dry weight") was determined using a Moisture Analyser MJ33 from the company Mettler-Toledo, Switzerland, with the following settings: drying temperature of 160° C., automatic switch off if the mass does not change more than 1 mg over a period of 30 sec, standard drying of 5 to 20 g of suspension.

Molecular Weight $M_w$, $M_n$ and Polydispersity Index Using GPC (SEC)

A test portion of the polymer solution corresponding to 90 mg of dry matter was introduced into a 10 ml flask. A mobile phase, with an additional 0.04 wt.-% of dimethylformamide, was added, until a total mass of 10 g was reached. The composition of said mobile phase at pH 9 was as follows: 0.05 mol/l $NaHCO_3$, 0.1 mol/l $NaNO_3$, 0.02 mol/l triethanolamine, and 0.03 wt.-% of $NaN_3$.

The SEC equipment was consisting of an isocratic pump of the Waters™ type, the flow rate of which was set at 0.8 ml/min, a Waters™ 717+ sample changer, a kiln containing a precolumn of the "Guard Column Ultrahydrogel Waters™" type which was 6 cm in length and had an internal diameter of 40 mm, followed by a linear column of the "Ultrahydrogel Waters™" type which was 30 cm in length and had an internal diameter of 7.8 mm.

Detection was accomplished by means of a Waters™ 410 type differential refractometer. The kiln is heated to a temperature of 60° C. and the refractometer is heated to a temperature of 45° C.

The SEC was calibrated with a series of sodium polyacrylate standards supplied by Polymer Standard Service having maximum molecular weight of between 2000 and $1 \cdot 10^6$ g/mol and a polydispersity index of between 1.4 and 1.7 and also with a sodium polyacrylate of average weight molecular weight of 5600 g/mol and polydispersity index equal to 2.4.

The calibration graph is of the linear type and takes account of the correction obtained using the flow rate marker (dimethylformamide).

Acquisition and processing of the chromatogram were accomplished through use of the PSS WinGPC Scientific v. 4.02 application. The chromatogram obtained was integrated in the area corresponding to molecular weights higher than 65 g/mol.

Degree of Carboxylation

The degree of carboxylation was determined by conductometric titration according to Katz et al. "The determination of strong and weak acidic groups in sulfite pulps" (Svensk Paperstidn., 1984, 6, pp. 48-53).

Wet Grinding

Without any specific indications, wet grinding was done in tap water (15° dH) in a horizontal attritor mill (Dynomill®, Type KDL-Pilot, Bachofen, Switzerland) having a volume of 1.4 liters in a recirculation mode, using zircon silicate beads of 0.6 to 1.2 mm diameter.

2. Examples

Example 1—Comparative Example

Preparation of Carboxymethylcellulose (CMC) Dispersant 1

7 kg CMC having an $M_w$ of 250000 g/mol and a carboxylation degree of 1.2 (commercially available from ACROS Organics) was dissolved in 180 kg water forming a 8.0 wt.-% solid solutions and stirred for 12 h at 80° C. (due to the high viscosity of the CMC solution an increase of the solids above 8.0 wt.-% was impossible). Subsequently, the solution was maintained at 80° C., and 400 ml of an aqueous 30 wt.-% $H_2O_2$ solution were added drop wise over a period of 8 h. Finally, the solution was stirred for another 12 h at 80° C. The pH of the solution was adjusted with 10% NaOH to 5. Subsequently, the pH was further increased to 9 with 10% calcium hydroxide solution.

The obtained CMC dispersant 1 had a polydispersity index of 3.2 ($M_w$: 9335 g/mol and $M_n$: 2880 g/mol) and a pH of 9.0.

Preparation of a Mineral Material Suspension Using the CMC Dispersant 1

An Italian Marble powder, having a $d_{50}$ value of 10 full was employed as mineral pigment material. A slurry with a solid content of 60 wt.-% was prepared by mixing 2 wt.-%, based on the total weight of solids in the slurry, of the prepared CMC dispersant 1 in form of a 7.8 wt.-% solution in water with the mineral pigment material and water. Subsequently, the obtained mixture was wet ground at 55° C. The grinding was carried out for 25 min until the particle size distribution, measured on a Sedigraph 5100, showed a fraction of 60 wt.-% smaller than 2 μm and 36.7 wt.-% smaller than 1 μm.

The obtained mineral material suspension had a solid content of 70.9 wt.-%, a pH of 8.6, and a Brookfield viscosity of 88 mPa·s.

Example 2—Inventive Example

Preparation of Carboxymethylcellulose (CMC) Dispersant 2

285.7 g water was heated to 80° C. and 0.009 g iron sulphate heptahydrate was added. Under agitation at 80° C. the following chemicals were added over a period of approximately 165 minutes: 150 g of a high molecular weight carboxymethylcellulose (Aqualon® CMC-12M8P, commercially available from Ashland Inc., USA) in 12 portions of 12.5 g at a time every 15 minutes; continuous injection of 14.26 g of an aqueous 35 wt.-% $H_2O_2$ solution at a rate of 0.086 g/minute. After completed addition, the reaction mixture was maintained at 80° C. under agitation for additional 4 hours. Subsequently, the reaction mixture was cooled down to 70° C. and neutralized to pH 8.6 with an aqueous solution containing 50 wt.-% sodium hydroxide and 10 wt.-% calcium hydroxide.

The obtained CMC dispersant 2 had a $M_w$ of 11035 g/mol, a $M_n$ of 3025 g/mol, a polydispersity index of 3.6 and was in form of a solution having a concentration of 34.5 wt.-%, based on the total weight of the solution, and a Brookfield viscosity of 1450 mPa·s at 20° C. (100 rpm, spindle 5) and 405 mPa·s at 60° C. (100 rpm, spindle 5).

Preparation of a Mineral Material Suspension Using the CMC Dispersant 2

A Norwegian Marble powder having a $d_{50}$ of 45 μm was employed as mineral pigment material.

A slurry with a solids content of 70 wt.-% was prepared by mixing 0.27 wt.-%, based on the total weight of the solids in the slurry, of the CMC dispersant 2 in form of the prepared 34.5 wt.-% solution with the mineral pigment material and water. Subsequently, the obtained mixture was wet ground until the particle size distribution, measured on a Sedigraph 5100, showed a fraction of 60.5 wt.-% smaller than 2 μm, 35.3 wt.-% smaller than 1 μm, and 8.1 wt.-% smaller than 0.2 μm.

The obtained pigment particle suspension had a solids content of 70.9 wt.-%. The Brookfield viscosity of the obtained suspension 1 hour after production, measured at 100 rpm was 84 mPa·s (spindle N° 2), the pH was 9.0, and the conductivity was 567 μS/cm.

After 14 days storage at room temperature, the Brookfield viscosity before steering was 986 mPa·s, the pH was 8.6 and the conductivity was 470 μS/cm. After steering at 3000 rpm the viscosity was 509 mPa·s.

Example 3—Inventive Example

Preparation of Carboxymethylcellulose (CMC) Dispersant 3

142 l water was heated to 80° C. and 0.004 kg iron sulphate heptahydrate was added. Under agitation at 80° C. the following chemicals were added over a period of approximately 165 minutes: 74.5 kg of carboxymethylcellulose (Aqualon® CMC-12M8P, commercially available from Ashland Inc., USA) in total 11 portions of 6.8 kg at a time every 15 minutes; continuous injection of 7.08 kg of an aqueous 35 wt.-% $H_2O_2$ solution at a rate of 42.9 g/minute. After completed addition the reaction solution was maintained at 80° C. under agitation for further 6 hours. Subsequently, the reaction mixture was cooled down to 63° C. and neutralized to pH 8.1 with a aqueous solution containing 50 wt.-% sodium hydroxide and 10 wt.-% calcium hydroxide.

The obtained CMC dispersant 3 had a $M_w$ of 13260 g/mol, a $M_n$ of 7095 g/mol, a polydispersity index of 4.2, and was in form of a solution having a concentration of 32.2 wt.-%, based on the total weight of the solution, and a Brookfield viscosity at 100 rpm of 2000 mPa·s using spindle 5 and 2040 mPa·s using spindle 6.

At a CMC concentration of 10 wt.-%, based on the total weight of the solution, the CMC dispersant 3 solution had a Brookfield viscosity of 35 mPa·s at 20° C. (100 rpm, spindle 2), at a CMC concentration of 25 wt.-%, the CMC dispersant 3 solution had a Brookfield viscosity of 228 mPa·s at 20° C. (100 rpm, spindle 5) and 245 mPa·s at 20° C. (100 rpm, spindle 3), and at a CMC concentration of 32.5 wt.-%, the CMC dispersant 3 solution had a Brookfield viscosity of 610 mPa·s at 65° C. (100 rpm, spindle 5).

Preparation of a Mineral Material Suspension Using the CMC Dispersant 3

A Finnish Marble powder having a $d_{50}$ of 15 μm was employed as mineral pigment material.

A slurry with a solids content of 70 wt.-% was prepared by mixing 0.26 wt.-%, based on the total weight of the solids in the slurry, of the CMC dispersant 3 in form of the prepared 32.5 wt.-% solution and 0.02 wt.-% phosphoric acid with the mineral pigment material and water. Subsequently, the obtained mixture was wet ground until the particle size distribution, measured on a Sedigraph 5100, showed a fraction of 50 wt.-% smaller than 2 μm, and 20.7 wt.-% smaller than 1 μm.

The obtained pigment particle suspension had a solids content of 70.4 wt.-%, and the specific surface area (BET) was 4.1 m²/g. The Brookfield viscosity of the obtained suspension 1 hour after production, measured at 100 rpm, was 120 mPa·s (spindle N° 2; room temp), the pH was 9.1.

Example 4—Inventive Example

A Finnish Marble powder having a $d_{50}$ of 15 μm was employed as mineral pigment material and dispersant 3 defined above in Example 3 was used as CMC dispersant.

A slurry with a solids content of 70 wt.-% was prepared by mixing 0.43 wt.-%, based on the total weight of the solids in the slurry, of the CMC dispersant 3 in form of the prepared 32.5 wt.-% solution and 0.02 wt.-% phosphoric acid with the mineral pigment material and water. Subsequently, the obtained mixture was wet ground until the particle size distribution, measured on a Sedigraph 5100, showed a fraction of 69 wt.-% smaller than 2 μm, and 35 wt.-% smaller than 1 μm.

The obtained pigment particle suspension had a solids content of 70.6 wt.-%, and the specific surface area (BET) was 6.5 m²/g. The Brookfield viscosity of the obtained suspension 1 hour after production, measured at 100 rpm, was 140 mPa·s and the pH was 9.2.

The invention claimed is:

1. A process for preparing an aqueous suspension comprising the steps of
    a) providing a mineral pigment material,
    b) providing a depolymerized carboxymethylcellulose having a degree of carboxylation in the range from 0.2 to 2.2, a molecular weight in the range from 5000 to 40000 g/mol, and a polydispersity index in the range from 2 to 10,
    wherein the depolymerized carboxymethyl cellulose is prepared by depolymerizing a high molecular weight carboxymethylcellulose in a process comprising the following steps:
        i) providing a high molecular weight carboxymethylcellulose having a molecular weight of more than 40000 g/mol and a degree of carboxylation in the range from 0.2 to 2.0,
        ii) providing a peroxide selected from hydrogen peroxide and/or an alkali metal salt thereof,
        iii) providing a catalyst,
        iv) mixing at least one part of the high molecular weight carboxymethylcellulose of step i) and/or at least one part of the peroxide of step ii) and/or at least one part of the catalyst of step iii) and water in any order at a reaction temperature from 50 to 85° C., and
        v) adding the remaining part of the high molecular weight carboxymethyl cellulose and/or the remaining part of the peroxide and/or the remaining part of the catalyst in one or more steps to the mixture obtained in step iv) until the mixture of step v) contains from 10 to 60 wt.-% depolymerized carboxymethylcellulose, based on the total weight of the mixture of step v), and until the mixture of step v) at the same time has a Brookfield viscosity between 30 and 10000 mPa·s at 20° C.,
        wherein during step v) the Brookfield viscosity of the mixture is maintained between 200 and 1500 mPa·s, measured at the reaction temperature,
    and
    c) mixing the depolymerized carboxymethylcellulose of step b), the mineral pigment material of step a) and water to form an aqueous suspension,
    wherein the mineral pigment material is added in an amount from 10 to 80 wt.-%, based on the total weight of the suspension, and
    wherein the depolymerized carboxymethylcellulose is added in an amount from 0.05 to 5.0 wt.-%, based on the total weight of the mineral pigment material in the suspension, and such that the Brookfield viscosity of the aqueous suspension is between 40 and 2000 mPa·s at 20° C.

2. The process according to claim 1, wherein the mineral pigment material is a calcium carbonate containing material selected from the group consisting of calcium carbonate, calcium carbonate containing minerals, mixed carbonate based fillers, or mixtures thereof.

3. The process according to claim 1, wherein the mineral pigment material is kaolin, talc, gypsum, lime, magnesia, titanium dioxide, satin white, aluminium trioxide, aluminium trihydroxide, silica, mica, or mixtures thereof.

4. The process according to claim 1, wherein the mineral pigment material is in form of particles having a weight median particle size $d_{50}$ from 0.1 to 100 μm.

5. The process according to claim 1, wherein the degree of carboxylation of the depolymerized carboxymethylcellulose is in the range from 0.5 to 1.8.

6. The process according to claim 1, wherein the depolymerized carboxymethylcellulose is added in an amount from 0.05 to 3.0 wt.-% based on the total weight of the mineral pigment material of the suspension.

7. The process according to claim 1, wherein the depolymerized carboxymethyl cellulose has a polydispersity index from 2 to 5.

8. The process according to claim 1, wherein the depolymerized carboxymethyl cellulose has a molecular weight in the range from 8000 to 35000 g/mol.

9. The process according to claim 1, wherein the solids content of the suspension obtained in step c) is adjusted so that it is from 45 to 80 wt.-% based on the total weight of the suspension.

10. The process according to claim 1, wherein the catalyst is selected from the group consisting of iron sulphate, sodium hypophosphite, iron phthalocyanine, sodium tungstate, or a mixture thereof.

11. The process according to claim 1, wherein the peroxide of step ii) is provided in an amount from 0.1 to 50 wt.% based on the total amount of the high molecular weight CMC of step i).

12. The process according to claim 1, wherein after step iv) and before step v) the viscosity of the mixture obtained in step iv) is adjusted to a Brookfield viscosity between 200 and 1500 mPa·s, measured at the reaction temperature, preferably by adding a further part of the remaining part of the high molecular weight carboxymethyl cellulose and/or a further part of the remaining part of the peroxide and/or a further part of the remaining part of the catalyst in one or more steps to the mixture obtained in step iv).

13. The process according to claim 1, wherein in step v) the remaining part of the high molecular weight carboxymethyl cellulose and/or the remaining part of the peroxide and/or the remaining part of the catalyst is/are added in one or more steps to the mixture obtained in step iv) until the mixture of step v) contains from 25 to 45 wt.-% depolymerized carboxymethyl cellulose based on the total weight of the mixture of step v), and/or until the mixture of step v) has a Brookfield viscosity between 50 and 5000 mPa-s at 20° C.

14. The process according to claim 4, wherein the mineral pigment material is in form of particles having a weight median particle size $d_{50}$ from 0.25 to 50 μm.

15. The process according to claim 14, wherein the mineral pigment material is in form of particles having a weight median particle size $d_{50}$ from 0.3 to 5 μm.

16. The process according to claim 15, wherein the mineral pigment material is in form of particles having a weight median particle size $d_{50}$ from 0.4 to 3.0 μm.

17. The process according to claim 5, wherein the degree of carboxylation of the depolymerized carboxymethylcellulose is in the range from 0.6 to 1.4.

18. The process according to claim 6, wherein the depolymerized carboxymethylcellulose is added in an amount from 0.1 to 2.0 wt.-% based on the total weight of the mineral pigment material of the suspension.

19. The process according to claim 18, wherein the depolymerized carboxymethylcellulose is added in an amount from 0.2 to 1.0 wt.-% based on the total weight of the mineral pigment material of the suspension.

20. The process according to claim 7, wherein the depolymerized carboxymethyl cellulose has a polydispersity index from 2.5 to 4.5.

21. The process according to claim 20, wherein the depolymerized carboxymethyl cellulose has a polydispersity index from 3 to 4.

22. The process according to claim 8, wherein the depolymerized carboxymethyl cellulose has a molecular weight in the range from 10000 to 20000 g/mol.

23. The process according to claim 9, wherein the solids content of the suspension obtained in step c) is adjusted so that it is from 50 to 78 wt.-% based on the total weight of the suspension.

24. The process according to claim 23, wherein the solids content of the suspension obtained in step c) is adjusted so that it is from 60 to 75 wt.-% based on the total weight of the suspension.

25. The process according to claim 11, wherein the peroxide of step ii) is provided in an amount from 0.2 to 40 wt.-%, based on the total amount of the high molecular weight CMC of step i).

26. The process according to claim 25, wherein the peroxide of step ii) is provided in an amount from 1 to 30 wt.-% based on the total amount of the high molecular weight CMC of step i).

27. The process according to claim 13, wherein in step v) the remaining part of the high molecular weight carboxymethyl cellulose and/or the remaining part of the peroxide and/or the remaining part of the catalyst is/are added in one or more steps to the mixture obtained in step iv) until the mixture of step v) contains from 30 to 40 wt.-% depolymerized carboxymethyl cellulose based on the total weight of the mixture of step v).

28. The process according to claim 13, wherein in step v) the remaining part of the high molecular weight carboxymethyl cellulose and/or the remaining part of the peroxide and/or the remaining part of the catalyst is/are added in one or more steps to the mixture obtained in step iv) until the mixture of step v) has a Brookfield viscosity between 1000 and 3000 mPa-s at 20° C.

29. The process according to claim 13, wherein in step v) the remaining part of the high molecular weight carboxymethyl cellulose and/or the remaining part of the peroxide and/or the remaining part of the catalyst is/are added in one or more steps to the mixture obtained in step iv) until the mixture of step v) has a Brookfield viscosity between 1500 to 2500 mPa-s at 20° C.

* * * * *